United States Patent
Hong et al.

(10) Patent No.: US 7,306,835 B2
(45) Date of Patent: Dec. 11, 2007

(54) THERMO-SHRINKABLE POLYESTER FILM

(75) Inventors: Ki Il Hong, Seoul (KR); Gi Sang Song, Gyeongsangbuk-do (KR)

(73) Assignee: Kolon Industries, Inc., Gyeonggi-Do (KR)

( * ) Notice: Subject to any disclaimer, the term of this patent is extended or adjusted under 35 U.S.C. 154(b) by 0 days.

(21) Appl. No.: 11/668,237

(22) Filed: Jan. 29, 2007

(65) Prior Publication Data

US 2007/0178326 A1    Aug. 2, 2007

(30) Foreign Application Priority Data

Jan. 27, 2006  (KR) .................. 10-2006-0008738
Jan. 26, 2007  (KR) .................. 10-2007-0008394

(51) Int. Cl.
  *B32B 27/36*  (2006.01)
  *B29C 55/00*  (2006.01)
  *C08G 63/02*  (2006.01)
  *C08G 63/12*  (2006.01)
  *C08G 63/16*  (2006.01)

(52) U.S. Cl. .................. 428/35.1; 428/34.9; 428/480; 428/910; 528/302; 528/305; 528/307; 528/308; 528/308.1; 528/308.6; 264/288.4; 264/290.2

(58) Field of Classification Search ............. None
See application file for complete search history.

(56) References Cited

U.S. PATENT DOCUMENTS

| 5,411,695 | A | * | 5/1995 | Yamada et al. | ........ 264/211.13 |
| 5,529,879 | A | * | 6/1996 | Hoshino et al. | ............ 430/160 |
| 5,574,119 | A | * | 11/1996 | Yamada et al. | ............ 528/310 |
| 5,989,680 | A | * | 11/1999 | Wakana et al. | ............ 428/141 |
| 6,168,851 | B1 | * | 1/2001 | Kubota | .................. 428/200 |
| 6,268,558 | B1 | * | 7/2001 | Kubota | .................. 136/244 |
| 6,781,148 | B2 | * | 8/2004 | Kubota et al. | ................. 257/40 |

FOREIGN PATENT DOCUMENTS

KR          9505726 B1 *  5/1995

* cited by examiner

*Primary Examiner*—Vivian Chen
(74) *Attorney, Agent, or Firm*—Sughrue Mion, PLLC

(57) ABSTRACT

The present invention relates to a thermo-shrinkable polyester film with a superior thermal shrinkage, which has an orientation angle of a molecular chain in a range of from 0° to about ±10° relative to a main shrinkage direction, and a molecular orientation ratio (MOR) in a range of from 1.29 to about 2.5, thereby preventing a label made from the film from curling or waving.

22 Claims, No Drawings

THERMO-SHRINKABLE POLYESTER FILM

CROSS-REFERENCE TO RELATED PATENT APPLICATION

This application claims the benefit of Korean Patent Application Nos. 10-2006-0008738, filed on Jan. 27, 2006 and 10-2007-0008394, filed Jan. 26, 2007, in the Korean Intellectual Property Office, the disclosure of which is incorporated herein in its entirety by reference.

BACKGROUND OF THE INVENTION

The present invention relates to a thermo-shrinkable polyester film with excellent thermoshrinkability.

DESCRIPTION OF RELATED ART

A thermo-shrinkable film is used as packing materials or labels for coating, binding or wrapping various containers (e.g. a bottle and a can) and longish objects (e.g. a pipe and a rod). For this purpose, a thermo-shrinkable film is cut into an appropriate size, and folded with the edges overlapped and glued together. An object such as a bottle or a can may be packed or bound by thermally shrinking the thermo-shrinkage film.

The thermo-shrinkable film is required to have thermo-shrinkability properties such as sealability and uniform shrinkage as well as basic properties such as heat resistance, chemical resistance, weatherability and printability.

However, poly(vinyl chloride) or polystyrene polymers, which have been used as a raw material for a thermo-shrinkage film, is not sufficient in heat-resistance, chemical resistance, weatherability and thermo-shrinkability. In particular, a thermo-shrinkable poly(vinyl chloride) film is far from eco-friendly when burnt up due to the chlorine component. A polystyrene film requires the use of special inks due to the inferior printability, and may cause difficulties in storage or print process due to high shrinkage.

A polyester film, which is known for their excellent heat resistance, weatherability and solvent resistance, has problems: (i) it is crystallized at high temperature, (ii) the strength may be lowered by a thermal history of shrinking process, followed by a high-temperature sterilization, and (iii) it is fragile and cracks or defects are easily formed by friction or impact. Specifically, the conventional thermo-shrinkable polyester film has shown the aforementioned problems during the high-speed thermo-shrinkage process or the transportation, which has been a problem in putting the thermo-shrinkable polyester film to practical use.

Recently, there have been various attempts made to overcome the aforementioned problems of a thermo-shrinkable polyester film. For example, U.S. Pat. No. 4,996,291 attempts to complement the weak strength of a polyester by restricting shrinkage coefficients.

Meanwhile, the conventional thermo-shrinkable films are also known to have shortcomings such as (i) uneven shrinkage and (ii) crinkling and edge curling during a high temperature quick shrinking process. These shortcoming have caused the deterioration of the appearance and quality of a labeled bottle.

SUMMARY OF THE INVENTION

The present invention provides a thermo-shrinkable polyester film that shows a stable thermo-shrinkage. A label made of the thermo-shrinkable polyester film is free from curling or waving and a container having such label may maintain rigid packing condition.

A polyester film according to an embodiment of the present invention shows a thermo-shrinkage substantially mainly in a main shrinkage direction and no or very little thermo-shrinkage in a direction perpendicular to the main shrinkage direction. In one embodiment according to the present invention, there is provided a thermo-shrinkable polyester film which has an orientation angle of a molecular chain of the film in a range of from 0° to about ±10° relative to a main shrinkage direction; and a molecular orientation ratio (MOR) represented by the following Formula 2 in a range of from about 1.29 to about 2.5, wherein the orientation angle of the molecular chain is a rotation angle (θ) at which a microwave transmit intensity, I(θ), has a maximum value, which is determined by the following Formula 1:

Formula 1

$$I(\theta)=I_o(\theta)/[I_{av}+Q^2\{W(\theta)W_o(\theta)-W_o(\theta)/W(\theta)\}^2],$$

Formula 2

$$\text{Molecular orientation ratio } (MOR)=I_{max}/I_{min},$$

wherein, I(θ) is a microwave transmit intensity at a rotation angle θ; $I_o$ is a microwave transmit intensity at a resonance point; $I_{av}$ is a mean microwave transmit intensities measured at each degree of rotation angles of 360 degrees; $W_o$ is a resonance angular frequency; W is an angular frequency; θ is a rotation angle; Q is a ratio of a resonance angular frequency to a half-wave width of a resonance curve ($W_o$/ΔW); $I_{max}$ is a maximum value of microwave transmit intensity; and $I_{min}$ is a minimum value of microwave transmit intensity.

Formula 1 and 2 are derived from the principle applied to determine the orientation of molecules by detecting the difference in the transmit intensity of microwave as a function of the rotation angle of a sample specimen and measuring the anisotropy through the information about the interaction between molecular dipole moment and polarized microwave in a sample film obtained by means of high-frequency microwave (GHz).

According to another embodiment, there is provided a thermo-shrinkable polyester film having a glass transition temperature of about 55-80° C., and an intrinsic viscosity of about 0.5-0.8 dl/g.

According to an exemplary embodiment, there is provided a thermo-shrinkable polyester film, which comprises: (a) a homopolyester; (b) a copolyester obtained from (i) at least one dicarboxylic acid component selected from the group consisting of a terephthalic acid, oxalic acid, malonic acid, succinic acid, adipic acid, suberic acid, azelaic acid, sebaic acid, phthalic acid, isophthalic acid, naphthalenedicarboxylic acid and diphenyl ether dicarboxylic acid, and (ii) at least one diol component selected from the group consisting of ethylene glycol, neopentyl glycol, propylene glycol, trimethylene glycol, tetramethylene glycol, hexamethylene glycol, diethylene glycol, polyalkylene glycol and 1,4-cyclohexane dimethanol; or (c) a mixture of the homopolyester and the copolyester.

The copolyester herein may comprise a terephthalic acid and an ethylene glycol, wherein the terephthalic acid unit accounts for at least about 70 mol % of total dicarboxylic acid components, and the ethylene glycol unit accounts for at least about 60 mol % of total diol components.

The copolyester herein may have a glass transition temperature of about 60-80° C., and an intrinsic viscosity of about 0.55-0.75 dl/g.

The homopolyester may be polybutylene terephthalates. The thermo-shrinkable polyester film may comprise two or more homopolyesters or a mixture of at least one homopolyesters and at least one copolyesters. When polybutylene terephthalate is employed as a homopolyester, it may account for about 3-25 wt % of the total weight of the polyester polymers.

In one embodiment of the present invention, a thermo-shrinkable polyester film may be prepared by (a) extruding a polyester polymer composition at 200-350° C., and (b) stretching the resulting extruded polyester film about 3.0-5.0 times in one direction at a temperature of between a glass transition temperature of the extruded polyester film and the glass transition temperature + about 30° C. According to an embodiment herein, a thermo-shrinkable polyester film may be further subjected to a heat treatment at a temperature lower than a glass transition temperature of extruded polyester film + about 30° C. for about 20 seconds or less.

In one embodiment of the present invention, the stretching may be performed at about 12-100 m/min.

In still another embodiment of the present invention, there is provided a process for preparing a thermo-shrinkable polyester film, which comprises:
  (a) extruding a polyester polymer composition at a temperature of about 200-350° C.; and
  (b) stretching a resulting extruded polyester 3.0-5.0 times in one direction at a temperature of between a glass transition temperature of the extruded polyester and the glass transition temperature + about 30° C. to give the thermo-shrinkable polyester film,
wherein the thermo-shrinkable polyester film has an orientation angle of a molecular chain of the film in a range from 0° to about ±10° relative to a main shrinkage direction; and a molecular orientation ratio (MOR) represented by the following Formula 2 in a range of from about 1.29 to about 2.5, wherein the orientation angle of the molecular chain is a rotation angle (θ) at which a microwave transmit intensity, I(θ), has a maximum value, which is determined by the following Formula 1:

Formula 1

$$I(\theta)=I_o(\theta)/[I_{av}+Q^2\{W(\theta)/W_o(\theta)-W_o(\theta)/W(\theta)\}^2],$$

Formula 2

Molecular orientation ratio $(MOR)=I_{max}/I_{min}$, wherein, I(θ) is a microwave transmit intensity at a rotation angle θ; $I_o$ is a microwave transmit intensity at a resonance point; $I_{av}$ is a mean microwave transmit intensities measured at each degree of rotation angles of 360 degrees; $W_o$ is a resonance angular frequency; W is an angular frequency; θ is a rotation angle; Q is a ratio of a resonance angular frequency to a half-wave width of a resonance curve ($W_o$/ΔW); $I_{max}$ is a maximum value of microwave transmit intensity; and $I_{min}$ is a minimum value of microwave transmit intensity.

According to an embodiment herein, the process may comprise further performing a heat treatment after the aforementioned step (b) at a temperature of a glass transition temperature of the extruded polyester film + about 30° C. for about 20 seconds or less.

The polyester composition may comprises at least one homopolyesters, at least one copolyesters, or a mixture of the homopolymer and the copolyester. The copolyesters may be selected from those described above. The copolyester may have a glass transition temperature of about 60-80° C. and an intrinsic viscosity of about 0.55-0.75 dl/g.

The copolyester may be a polybutylene terephthalate. When the polyester composition comprises polybutylene terephthalate, the later may account for about 3-25 wt % of the total weight of the polyester composition.

In one embodiment of the present invention, the thermo-shrinkable polyester film has a glass transition temperature of about 55-80° C. and an intrinsic viscosity of about 0.5-0.8 dl/g.

In one embodiment of the present invention, the stretched thermo-shrinkable polyester film may be further subjected to stretching at a speed of about 12-100 m/min.

DETAILED DESCRIPTION OF THE INVENTION

To prepare a shrinkable film, a polyester polymer composition may be first uniaxially stretched at a low temperature. An uniaxial stretching at a low temperature makes it help for the resulting thermo-shrinkable polyester film to be oriented in one direction to the maximum extent. The film may retain a residual strain by omitting a thermal treatment. The residual strain may cause the film to shrink in the final shrinkage process. When shrinkage is completed for a short period of time, the shrinkage properties, such as crinkle or edge curl, may be dependent on the orientation angle of a molecular chain of the film in the main shrinkage direction.

In one embodiment according to the present invention, there is provided a thermo-shrinkable polyester film which has an orientation angle of a molecular chain of the film in a range of from 0° to about ±10° relative to a main shrinkage direction; and a molecular orientation ratio (MOR) represented by the following Formula 2 in a range of from about 1.29 to about 2.5, wherein the orientation angle of the molecular chain is a rotation angle (θ) at which a microwave transmit intensity, I(θ), has a maximum value, which is determined by the following Formula 1:

Formula 1

$$I(\theta)=I_o(\theta)/[I_{av}+Q^2\{W(\theta)/W_o(\theta)-W_o(\theta)/W(\theta)\}^2],$$

Formula 2

Molecular orientation ratio $(MOR)=I_{max}/I_{min}$, wherein, I(θ) is a microwave transmit intensity at a rotation angle θ; $I_o$ is a microwave transmit intensity at a resonance point; $I_{av}$ is a mean microwave transmit intensities measured at each degree of rotation angles of 360 degrees; $W_o$ is a resonance angular frequency; W is an angular frequency; θ is a rotation angle; Q is a ratio of a resonance angular frequency to a half-wave width of a resonance curve ($W_o$/ΔW); $I_{max}$ is a maximum value of microwave transmit intensity; and $I_{min}$ is a minimum value of microwave transmit intensity.

A Molecular Orientation Analyzer may be used to determine the MOR.

If the orientation angle of the molecular chain exceeds about ±10° relative to a main shrinkage direction, the film may crinkle and the edge of the film may curl along one direction, e.g. a machine direction (MD), or a direction perpendicular to a main shrinkage direction, e.g. a transverse direction (TD).

Further, if the molecular orientation ratio (MOR) is less than about 1.29, various problems may happen such as the decrease in shrinkage and twist, crinkle or non-uniform shrinkage of the film along a main shrinkage direction, e.g. transverse direction (TD) due to the attenuation of orientation along the main shrinkage direction.

As used herein, the term 'main shrinkage direction' may be defined as a direction, in which a shrinkage is the most significant when exposed to heat medium such as hot water or hot air for a certain period of time.

A thermo-shrinkable polyester film herein that satisfies the aforementioned properties may be prepared by using a polyester resin composition which comprises: (a) a homopolyester; (b) a copolyester obtained from (i) at least one dicarboxylic acid component selected from the group consisting of a terephthalic acid, oxalic acid, malonic acid, succinic acid, adipic acid, suberic acid, azelaic acid, sebaic acid, phthalic acid, isophthalic acid, naphthalenedicarboxylic acid and diphenyl ether dicarboxylic acid, and (ii) at least one diol component selected from the group consisting of ethylene glycol, neopentyl glycol, propylene glycol, trimethylene glycol, tetramethylene glycol, hexamethylene glycol, diethylene glycol, polyalkylene glycol and 1,4-cyclohexane dimethanol; or (c) a mixture of the homopolyester and the copolyester.

A copolyester polymer composition herein may comprise a terephthalic acid which accounts for about 70 mol % of the total amount of dicarboxylic acid units, and an ethylene glycol unit which accounts for about 60 mol % of the diol units. A polyester polymers may be prepared using one of conventional methods which are known to one skilled in the art. Examples of the conventional methods include, but are not limited to, a direct esterification where a dicarboxylic acid is directly reacted with a diol, and a transesterification where a dimethylester of a dicarboxylic acid is reacted with a diol.

According to an embodiment of the present invention, a copolyester has a glass transition temperature of about 60° C. about 80° C. and an intrinsic viscosity of about 0.55-0.75 dl/g. The glass transition temperature and the intrinsic viscosity may vary depending on the monomer compositions and polymerization degree, respectively. The present invention may use the copolyesters, of which the glass transition temperature and the intrinsic viscosity are adjusted within the aforementioned ranges. When a mixture of at least two kinds of polyester resins is used, terephthalic acid may account for at least 70 mol % of the total dicarboxylic acid units and ethylene glycol may account for at least 60 mol % of the total diol units.

For example, the present invention may employ a polybutylene terephthalate resin as a homopolyester, and a film may be prepared by using a mixture of polybutylene terephthalate resins and copolyesters. In this case, the amount of the polybutylene terephthalate resin may be about 3-25 wt % relative to the weight of the total polyester resins. In an embodiment of the present invention, the amount of polybutylene terephthalate resin is about 5-15 wt % relative to the weight of the total polyester resins.

When commercially used, the adhesion of a shrinkable film is achieved after the shrinkable film is dissolvent in a solvent. If the content of polybutylene terephthalate is too low, the solvent adhesive strength is not sufficient for the application. In contrast, if the polybutylene terephthalate content is too high, shrinkage may not be enough in a main shrinkage direction, e.g. a transverse direction (TD) and the physical properties such as strength and elongation may be deteriorated in a direction perpendicular to the main shrinkage direction, e.g. a machine direction (MD). Typically, a film needs to have an excellent physical property along the machine direction because it is subject to various role processes, and the film may be cut if the physical property in the machine direction is not good enough.

Lubricants such as titanium dioxide, silica powders and potassium carbonate may be added to improve the sliding property of a film. If needed, various additives such as antistatic agents, antioxidants, UV absorbers and dyes may also be added.

A thermo-shrinkage polyester film having the aforementioned properties may be prepared as described below.

A polyester resin composition for manufacturing a polyester film can be dried using a conventional drier, and extruded at about 200-350° C. Any known extruding method may used herein such as T-die extrusion and tubular extrusion.

The extruded polyester is rapidly cooled, for example, by using an electrostatic charge contact method, to give a cast film.

The cast film is stretched at a temperature of between a glass transition temperature (Tg) of the extruded polyester and Tg+30° C. In an embodiment, the cast film may be stretched at a temperature near the Tg.

Typically, the stretching process may be a sequential biaxial, simultaneous bixaxial, or uniaxial stretching, or a combination thereof. In one embodiment of the present invention, a thermo-shrinkable polyester film having a maximum uniaxial orientation may be obtained by uniaxially stretching the cast polyester film.

Preferably, the uniaxial stretching is performed for a time period of between 1 second and about 10 seconds so that a length in one direction may be about 3.0-3.5 times of the original length.

If the stretching temperature is too low, a film may be non-uniformly stretched or may be cut without being stretched. When the temperature is too high, the shrinkage of the resulting thermo-shrinkable film may be lowered. Thus, the stretching temperature may be determined within the range between the Tg of the extruded polyester cast film and Tg+30° C.

Further, if the stretching ratio is too low, the shrinkage of the resulting thermo-shrinkable film may be lowered. In contrast, if the stretching ratio is too high, there may not be additional improvements in properties or the film may be cut. Therefore, the stretching ratio may be determined within the range of about 3.0-5.0 times of the original length.

In one embodiment of the present invention, the stretching process may be performed at a speed of about 12-100 m/min. The speed may be chosen depending on the intrinsic viscosity or transition temperature of the polyester resin and/or the condition of post-stretching heat treatment.

If the speed is too slow, relative value of orientation angle may be increased and molecular orientation ratio may be decreased.

The stretching process may be performed using conventional devices and methods such as a roll, a tenter or a tubular method.

After the stretching process, the film may optionally be subjected to a heat treatment. Heat treatment may be carried out at a temperature lower than a glass transition temperature (Tg) of the extruded polyester film plus about 30° C. for about 20 seconds or less.

Thus obtained thermo-shrinkable polyester film has a glass transition temperature of about 55-80° C. and an intrinsic viscosity of about 0.5-0.8 dl/g.

Although the glass transition temperature of a film typically depends on that of a raw material resin, the intrinsic viscosity of a film may vary with extruding conditions. Thus, the intrinsic viscosity of a film may be controlled within the aforementioned range by changing the extruding conditions considering the aforementioned thermo-shrinkage properties. A decreased intrinsic viscosity of a film does not affect the properties of the film in a main orientation, but may cause an increase of the number of the molecular chains that are not oriented along the main shrinkage direction. This lowers the MOR value. As a result, a shrinkage is increased along a direction perpendicular to a main orientation axis, while it is decreased along the main orientation axis. Therefore, a film has an intrinsic viscosity of at least 0.5 dl/g to satisfy the shrinkage property.

Meanwhile, although an increase in the intrinsic viscosity of a film does not affect the shrinkage property of the film, the intrinsic viscosity of raw materials needs to be raised to increase in the intrinsic viscosity of the film. The intrinsic viscosity of the raw materials may be appropriately determined considering the viscosity of film, to the extent that a high intrinsic viscosity of the raw materials does not cause problems in the extrusion and stretching processes.

An analysis of the molecular orientation of a thermal-shrinkage polyester film and the terms used herein are described below.

(1) Principle

The molecular orientation is determined by detecting the difference in the transmit intensity of microwave as a function of the rotation angle of a sample specimen and measuring the anisotropy through the information about the interaction between the molecular dipole moment and the polarized microwave in a sample film obtained by means of high-frequency microwave (GHz). Anisotropy in the orientation of molecular chains may be determined from the angular dependency of the microwave transmit intensity. Transmit intensity as the function of the rotation angle may be represented by the following Formula 1.

Formula 1:

$$I(\theta)=I_o(\theta)/[I+Q^2\{W(\theta)/W_o(\theta)-W_o(\theta)/W(\theta)\}^2]$$

wherein, $I_o$, $I_{av}$, $W_o$, $W$, $\theta$, $Q$, $I_{max}$, and $I_{min}$ are as defined above.

The aforementioned principle may provide information about orientation angle of a main molecular chain, electrical property and anisotropy (from orientation of molecules and transmit intensity in a widthwise direction of film/transmit intensity in a machine direction). Samples need to have a uniform thickness, as orientation degree (MOR value) is dependent on the thickness of the film, although the orientation angle is not affected by the thickness. Considering the regional variation, film species were sampled from the edge parts in the widthwise direction, which show a relatively low orientation relative to a mill roll. These information may be used to determine mechanical and physical properties as well as anisotropy of films during manufacturing processes.

(2) Orientation Angle

The orientation angle is an angle of the main axis of molecular chain relative to a transverse direction (TD) of a film. The counterclockwise rotation and the clockwise rotation are indicated as '+' and '−', respectively. An angle, which shows the maximum value of I(θ) value, is considered as an orientation angle of the molecular chain in the main shrinkage direction.

(3) Molecular Orientation Ratio (MOR)

An index of anisotropy that shows how much portion of the molecular chains is oriented along the main orientation axis by means of maximum or minimum value of microwave transmit intensity ($I_{max}/I_{min}$). The orientation angle and the MOR of a film may be determined using a MOA (Molecular Orientation Analyzer; MOA-20001A, KS-System, Japan).

EXAMPLES

The present invention is described more specifically by the following Examples. Examples herein are meant only to illustrate the present invention, but in no way to limit the claimed invention.

Hereunder is provided a description of method of measuring or evaluating the properties.

(1) Intrinsic Viscosity 200 mg of a specimen was placed in 20 mL of a 50:50 mixture of phenol and tetrachloroethane. Intrinsic viscosity was measured at 30° C. after the mixture was heated at about 110° C. for one hour.

(2) Glass Transition Temperature

Glass transition temperature was measured by heating a specimen at rate of 20° C./minute using DSC-7 (Perkin-Elmer Corp.).

(3) Shrinkage of Film

Film specimens were printed and prepared into a cylindrical form. This cylindrical film (label) was attached to a heat-resistant plastic bottle (PET), and subject to shrinkage in an oven at 100° C. for 15 seconds. The finally shrunken films were observed with naked eyes, and the twist and the distortion of the label prints in the films were determined by measuring the difference in length of pre-drawn lines in MD and TD directions.

The twist and the distortion of the label prints in the films were evaluated as follows.

O: Nearly no defect in film
□: Substantially usable despite defects
X: Substantially unusable due to defects
Print twist=Deviation of PET bottle circumference from horizontal plane
Print distortion=Shrinkage in a direction perpendicular to the PET bottle circumference (4) Thermo-Shrinkage Films were cut into 20 cm×20 cm along a main direction, and subject to the thermal shrinkage under no-load conditions in hot water (95±0.5° C.) for 10 seconds. Dimensions of the films were measured in machine direction and transverse direction, respectively, and thermo-shrinkage was calculated using the following formula.

$$\text{Thermo}-\text{shrinkage} = \left(\frac{\text{length before shrinkage} - \text{length after shrinkage}}{\text{Length before shrinkage}}\right)\times 100$$

Example 1

Polycondensation was performed according to a direct esterification by using 100 mol % of terephthalic acid as a dibasic acid component, and 82 mol % of ethylene glycol and 18 mol % of neopentyl glycol as a glycol component in the presence of antimony trioxide (0.05 mol relative to the acid component) as a catalyst. Titanium dioxide powders (average particle diameter: 0.8 μm) were added to the obtained polymer in an amount of 500 ppm, and dried to provide a copolyester polymer having an intrinsic viscosity of 0.75 dl/g and a glass transition temperature of 70° C.

Polybutylene terephthalate resin having an intrinsic viscosity of 1.03 dl/g and a glass transition temperature of 30° C. was prepared from 100 mol % of terephthalic acid and 100 mol % of 1,4-butanediol in the presence of tetrabutyl titanate (0.015 weight parts) as a catalyst.

The copolyester (90 wt %) and the polybutylene terephthalate (10 wt %) were blended and extruded from an extruder (280° C.), followed by quick-cooling and solidification, thus providing a casting film.

The casting film was immediately placed in a tenter, stretched 4.0 times in a widthwise direction at 75° C. (stretching time 8.4 sec., length of stretching zone 7 m, stretching speed 31 m/min) and passed through a heating section in the tenter without applying heat while being stretched about 3% in a transverse direction (TD). As a result, thermo-shrinkable film having a thickness of 50 μm was prepared, and the properties of the film are presented in Table 1.

Example 2

A casting film obtained as described in Example 1 was also used herein. The casting film was immediately placed in a tenter, stretched 4.0 times in a widthwise direction at 95° C. (stretching time 8.4 sec., length of stretching zone 7 m, stretching speed 31 m/min), and passed through a heating section in the tenter without applying heat while being stretched about 3% in a transverse direction (TD). As a result, thermo-shrinkable film having a thickness of 50 μm was prepared, and the properties of the film are presented in Table 1.

Example 3

A casting film obtained as described in Example 1 was also used herein. The casting film was immediately placed in a tenter, stretched 4.0 times in a widthwise direction at 95° C. (stretching time 8.4 sec., length of stretching zone 7 m, stretching speed 31 m/min), and heat-treated at 95° C. for 10 seconds while being stretched about 3% in a transverse direction (TD). As a result, thermo-shrinkable film having a thickness of 50 μm was prepared, and the properties of the film are presented in Table 1.

Example 4

A casting film obtained as described in Example 1 was also used herein. The casting film was immediately placed in a tenter, stretched 3.0 times in a widthwise direction at 75° C. (stretching time 8.4 sec., length of stretching zone 7 m, stretching speed 20.7 m/min), and passed through a heating section in the tenter without applying heat while being stretched about 3% in a transverse direction (TD). As a result, thermo-shrinkable film having a thickness of 50 μm was prepared, and the properties of the film are presented in Table 1.

Example 5

A casting film obtained as described in Example 1 was also used herein. The casting film was immediately placed in a tenter, stretched 5.0 times in a widthwise direction at 95° C. (stretching time 8.4 sec., length of stretching zone 7 m, stretching speed 41.4 m/min), and passed through a heating section in the tenter without applying heat while being stretched about 3% in a transverse direction (TD). As a result, thermo-shrinkable film having a thickness of 50 μm was prepared, and the properties of the film are presented in Table 1.

Example 6

Polycondensation was performed according to a direct esterification by using 100 mol % of terephthalic acid as a dibasic acid component and 85 mol % of ethylene glycol and 15 mol % of neopentyl glycol as a glycol component in the presence of antimony trioxide (0.05 mol relative to the acid component) as a catalyst. Titanium dioxide powders (average particle diameter: 0.8 μm) were added to the obtained polymer in an amount of 500 ppm, and dried to give a copolyester having an intrinsic viscosity of 0.75 dl/g and a glass transition temperature of 72° C.

A polybutylene terephthalate resin having an intrinsic viscosity of 1.03 dl/g and a glass transition temperature of 30° C. was prepared from 100 mol % of terephthalic acid and 100 mol % of 1,4-butanediol in the presence of tetrabutyl titanate (0.015 weight parts) as a catalyst.

The copolyester (90 wt %) and the polybutylene terephthalate (10 wt %) were blended and extruded from an extruder (280° C.), followed by quick-cooling and solidification, thus providing an unextended film.

The casting film was immediately placed in a tenter, stretched 4.0 times in a widthwise direction at 75° C. (stretching time 8.4 sec., length of stretching zone 7 m, stretching speed 31 m/min), and passed through a heating section in the tenter without applying heat while being stretched about 3% in a transverse direction (TD). As a result, thermo-shrinkable film having a thickness of 50 μm was prepared, and the properties of the film are presented in Table 1.

Example 7

A thermo-shrinkable film was prepared as described in Example 1 except that the degree of polymerization of copolyester was so controlled that an intrinsic viscosity and a glass transition temperature of the copolyester were 0.65 dl/g and 70° C., respectively.

Example 8

A thermo-shrinkable film was prepared as described in Example 1 except that the degree of polymerization of copolyester was so controlled that an intrinsic viscosity and a glass transition temperature of the copolyester were 0.55 dl/g and 70° C., respectively.

Comparative Example 1

A thermo-shrinkable film was prepared as described in Example 1 except that the degree of polymerization of copolyester was so controlled that an intrinsic viscosity and a glass transition temperature of the copolyester were 0.53 dl/g and 70° C., respectively.

Comparative Example 2

A thermo-shrinkable film was prepared as described in Example 1 except that polycondensation was performed by using 100 mol % of terephthalic acid as a dibasic acid component and 78 mol % of ethylene glycol and 32 mol % of neopentyl glycol as a glycol component in the presence of antimony trioxide (0.05 mol relative to the acid component and that the prepared copolyester has an intrinsic viscosity of 0.75 dl/g and a glass transition temperature of 52° C.

Comparative Example 3

Polycondensation was performed according to a direct esterification by using 100 mol % of terephthalic acid as a dibasic acid component and 82 mol % of ethylene glycol and 18 mol % of neopentyl glycol as a glycol component in the presence of antimony trioxide (0.05 mol relative to the acid component) as a catalyst. Titanium dioxide powders (average particle diameter: 0.8 μm) were added to the obtained polymer in the amount of 500 ppm, and dried to give a copolyester having an intrinsic viscosity of 0.75 dl/g and a glass transition temperature of 70° C.

A polybutylene terephthalate resin having an intrinsic viscosity of 1.03 dl/g and a glass transition temperature of 30° C. was prepared by using 100 mol % of terephthalic acid and 100 mol % of 1,4-butanediol in the presence of tetrabutyl titanate (0.015 weight parts) as a catalyst.

The copolyester (90 wt %) and the polybutylene terephthalate (10 wt %) were blended and extruded from an extruder (280° C.), followed by quick-cooling and solidification, thus providing a casting film.

The casting film was immediately placed in a tenter, stretched 4.0 times in a widthwise direction at 105° C. (stretching time 8.4 sec., length of stretching zone 7 m, stretching speed 31 m/min), and passed through a heating section in the tenter without applying heat while being stretched about 3% in a transverse direction (TD). As a result, thermo-shrinkable film having a thickness of 50 μm was prepared, and the properties of the film are presented in Table 1.

Comparative Example 4

A casting film obtained as described in Example 3 was also used herein. The casting film was immediately placed in a tenter, stretched 4.0 times in a widthwise direction at 95° C. (stretching time 8.4 sec., length of stretching zone 7 m, stretching speed 31 m/min), and heat-treated at 150° C. for 10 seconds while being stretched about 3% in a transverse direction (TD). As a result, thermo-shrinkable film having a thickness of 50 μm was prepared, and the properties of the film are presented in Table 1.

Comparative Example 5

A casting film obtained as described in Example 3 was also used herein. The casting film was immediately placed in a tenter, stretched 2.0 times in a widthwise direction at 75° C. (stretching time 8.4 sec., length of stretching zone 7 m, stretching speed 10.6 m/min), and passed through a heating section in the tenter without applying heat while being stretched about 3% in a transverse direction (TD). As a result, thermo-shrinkable film having a thickness of 50 μm was prepared, and the properties of the film are presented in Table 1.

TABLE 1

| | Intrinsic Viscosity (dl/g) | Glass transition Temperature (° C.) | Orientation Angle (°) | Thermal Shrinkage (%) MOR | Thermal Shrinkage (%) MD | Thermal Shrinkage (%) TD | Twist of label prints | Distortion of label prints |
|---|---|---|---|---|---|---|---|---|
| Ex. 1 | 0.70 | 72 | 2 | 1.527 | 0 | 75 | O | O |
| Ex. 2 | 0.70 | 72 | 5 | 1.575 | 1 | 60 | O | O |
| Ex. 3 | 0.70 | 72 | −7 | 1.357 | 2 | 58 | O | O |
| Ex. 4 | 0.70 | 72 | 3 | 1.558 | 0 | 63 | O | O |
| Ex. 5 | 0.70 | 72 | 0 | 1.782 | 0 | 75 | O | O |
| Ex. 6 | 0.70 | 73 | 1 | 1.557 | 1 | 61 | O | O |
| Ex. 7 | 0.62 | 72 | 3 | 1.402 | 3 | 68 | O | O |
| Ex. 8 | 0.54 | 72 | 4 | 1.327 | 5 | 60 | O | O |
| Com. Ex. 1 | 0.50 | 72 | 4 | 1.280 | 8 | 54 | □ | X |
| Com. Ex. 2 | 0.69 | 53 | 5 | 1.264 | 10 | 77 | X | X |
| Com. Ex. 3 | 0.70 | 72 | −11 | 1.239 | 6 | 40 | □ | X |
| Com. Ex. 4 | 0.70 | 72 | 12 | 1.113 | 11 | 38 | X | X |
| Com. Ex. 5 | 0.70 | 72 | 11 | 1.057 | 7 | 50 | □ | X |

The results in Table 1 show that thermo-shrinkable polyester films having an orientation angle of a molecular chain measured according to a microwave molecule orientation analysis (MOA) in a range of from 0° to about ±10° relative to a main shrinkage direction and a molecular orientation ratio (MOR) of about 1.3 or higher are excellent in thermo-shrinkage in a main shrinkage direction, i.e. a transverse direction (TD), while they exhibit remarkably low thermo-shrinkage in a direction perpendicular to the TD, i.e. a machine direction (MD). Further, the thermo-shrinkable polyester films of Examples show no problems found in the films of Comparative Examples, such as the twist or distortion of label prints and/or the decrease of shrinkage in transverse direction (TD).

As described above, the present invention shows a stable thermo-shrinkage in a certain direction, and may prevent a label from curling or waving and maintain the rigid packing condition.

What is claimed is:

1. A thermo-shrinkable polyester film having an orientation angle of a molecular chain of the film in a range of from 0° to about ±10° relative to a main shrinkage direction; and a molecular orientation ratio (MOR) represented by the following Formula 2 in a range of from about 1.29 to about 2.5, wherein the orientation angle of the molecular chain is a rotation angle (θ) at which a microwave transmit intensity, I(θ), has a maximum value, the microwave transmit intensity being determined by the following Formula 1:

Formula 1

$$I(\theta)=I_o(\theta)/[I_{av}+Q^2\{W(\theta)/W_o(\theta)-W_o(\theta)/W(\theta)\}^2],$$

Formula 2

$$\text{Molecular orientation ratio } (MOR)=I_{max}/I_{min},$$

wherein, I(θ) is a microwave transmit intensity at a rotation angle θ; $I_o$ is a microwave transmit intensity at a resonance point; $I_{av}$ is a mean microwave transmit intensities measured at each degree of rotation angles of 360 degrees; $W_o$ is a resonance angular frequency; W is an angular frequency; θ is a rotation angle; Q is a ratio of a resonance angular frequency to a half-wave width of a resonance curve ($W_o$/ΔW); $I_{max}$ is a maximum value of microwave transmit intensity; and $I_{min}$ is a minimum value of microwave transmit intensity.

2. The thermo-shrinkable polyester film of claim 1, which has a glass transition temperature of about 55-80° C., and an intrinsic viscosity of about 0.5-0.8 dl/g.

3. The thermo-shrinkable polyester film of claim 2, which comprises a polyester resin selected from the group consisting of:
(a) a homopolyester;
(b) a copolyester formed from (i) at least one dicarboxylic acid component selected from the group consisting of a terephthalic acid, oxalic acid, malonic acid, succinic acid, adipic acid, suberic acid, azelaic acid, sebaic acid, phthalic acid, isophthalic acid, naphthalenedicarboxylic acid and diphenyl ether dicarboxylic acid, and (ii) at least one diol component selected from the group consisting of an ethylene glycol, neopentyl glycol, propylene glycol, trimethylene glycol, tetramethylene glycol, hexamethylene glycol, diethylene glycol, polyalkylene glycol and 1,4-cyclohexane dimethanol; and
(c) a mixture of the homopolyester and the copolyester.

4. The thermo-shrinkable polyester film of claim 3, wherein the copolyester comprises a terephthalic acid unit in an amount at least about 70 mol % of total dicarboxylic acid components, and an ethylene glycol unit in an amount at least about 60 mol % of total diol components.

5. The thermo-shrinkable polyester film of claim 4, wherein the copolyester has a glass transition temperature of about 60-80° C., and an intrinsic viscosity of about 0.55-0.75 dl/g.

6. The thermo-shrinkable polyester film of claim 3, wherein the homopolyester is a polybutylene terephthalate.

7. The thermo-shrinkable polyester film of claim 6, which comprises polybutylene terephthalate in an amount of about 3-25 wt % relative to the weight of the total polyester resin.

8. The thermo-shrinkable polyester film of claim 1, which comprises a polyester resin selected from the group consisting of:
(a) a homopolyester;
(b) a copolyester formed from (i) at least one dicarboxylic acid component selected from the group consisting of a terephthalic acid, oxalic acid, malonic acid, succinic acid, adipic acid, suberic acid, azelaic acid, sebaic acid, phthalic acid, isophthalic acid, naphthalenedicarboxylic acid and diphenyl ether dicarboxylic acid, and (ii) at least one diol component selected from the group consisting of an ethylene glycol, neopentyl glycol, propylene glycol, trimethylene glycol, tetramethylene glycol, hexamethylene glycol, diethylene glycol, polyalkylene glycol and 1,4-cyclohexane dimethanol; and
(c) a mixture of the homopolyester and the copolyester.

9. The thermo-shrinkable polyester film of claim 8, wherein the copolyester comprises a terephthalic acid unit in an amount at least about 70 mol % of total dicarboxylic acid components, and an ethylene glycol unit in an amount at least about 60 mol % of total diol components.

10. The thermo-shrinkable polyester film of claim 8, wherein the copolyester has a glass transition temperature of about 60-80° C., and an intrinsic viscosity of about 0.55-0.75 dl/g.

11. The thermo-shrinkable polyester film of claim 8, wherein the homopolyester is a polybutylene terephthalate.

12. The thermo-shrinkable polyester film of claim 11, which comprises polybutylene terephthalate in an amount of about 3-25 wt % relative to the weight of the total polyester resin.

13. The thermo-shrinkable polyester film of claim 1, which is prepared by (a) extruding a polyester composition at 200-350° C., and (b) stretching a resulting extruded polyester film about 3.0-5.0 times in one direction at a temperature of between a glass transition temperature (Tg) of the extruded polyester film and the Tg+ about 30° C.

14. The thermo-shrinkable polyester film of claim 13, wherein a stretched polyester film obtained in (b) is further subject to a heat treatment at a temperature lower than Tg+ about 30° C. for about 20 seconds or less.

15. The thermo-shrinkable polyester film of claim 13, wherein a stretching speed is about 12-100 m/min.

16. A process for prepare a thermo-shrinkable polyester film, which comprises:
(a) extruding a polyester polymer composition at a temperature of about 200-350° C.; and
(b) stretching a resulting extruded polyester film 3.0-5.0 times in one direction at a temperature of between a glass transition temperature (Tg) of the extruded polyester film and Tg+ about 30° C. to give the thermo-shrinkable polyester film,
wherein the thermo-shrinkable polyester film has an orientation angle of a molecular chain of the film in a range of from 0° to about ±10° relative to a main shrinkage direction; and
a molecular orientation ratio (MOR) represented by the following Formula 2 in a range of from about 1.29 to about 2.5, wherein the orientation angle of the molecular chain is a rotation angle ($\theta$) at which a microwave transmit intensity, I($\theta$), has a maximum value, the microwave transmit intensity being determined by the following Formula 1:

Formula 1

$I(\theta)=I_o(\theta)/[I_{av}+Q^2\{W(\theta)/W_o(\theta)-W_o(\theta)/W(\theta)\}^2]$, Formula 2

Molecular orientation ratio $(MOR)=I_{max}/I_{min}$, wherein, I($\theta$) is a microwave transmit intensity at a rotation angle $\theta$; $I_o$ is a microwave transmit intensity at a resonance point; $I_{av}$ is a mean microwave transmit intensities measured at each degree of rotation angles of 360 degrees; $W_o$ is a resonance angular frequency; W is an angular frequency; $\theta$ is a rotation angle; Q is a ratio of a resonance angular frequency to a half-wave width of a resonance curve ($W_o/\Delta W$); $I_{max}$ is a maximum value of microwave transmit intensity; and $I_{min}$ is a minimum value of microwave transmit intensity.

17. The process of claim 16, further comprising the step of (c) performing a heat treatment after the step (b) at a temperature lower than a glass transition temperature of the extruded polyester film + about 30° C., for about 20 seconds or less.

18. The process of claim 16, wherein the polyester composition comprises a copolyester which has a glass transition temperature of about 60-80° C., and an intrinsic viscosity of about 0.55-0.75 dl/g.

19. The process of claim 16, wherein the polyester composition comprise a polybutylene terephthalate.

20. The process of claim 19, wherein the polybutylene terephthalate accounts for an amount of about 3-25 wt % relative to the total weight of the polyester composition.

21. The process of claim 16, wherein the thermo-shrinkable film has a glass transition temperature of about 55-80° C., and an intrinsic viscosity of about 0.5-0.8 dl/g.

22. The process of claim 16, wherein the stretching is carried out at a speed of about 12-100 m/min.

* * * * *